L. D. JONES.

VEHICLE SPRING.

APPLICATION FILED OCT. 9, 1915.

Reissued Mar. 28, 1916.

14,094.

Attest:

H. R. Conway.

Lyman D. Jones,

Inventor:

by

Thos. H. Corrigan,

Atty.

THE COLUMBIA PLANOGRAPH CO., WASHINGTON, D. C.

UNITED STATES PATENT OFFICE.

LYMAN D. JONES, OF BRIDGEPORT, CONNECTICUT, ASSIGNOR TO JONES PNEUMATIC TIRE SPRING CO., INC., OF NEW YORK, N. Y., A CORPORATION OF NEW YORK.

VEHICLE-SPRING.

14,094. Specification of Reissued Letters Patent. Reissued Mar. 28, 1916.

Original No. 1,145,686, dated July 6, 1915, Serial No. 868,056. Application for reissue filed October 9, 1915. Serial No. 55,078.

*To all whom it may concern:*

Be it known that I, LYMAN D. JONES, a citizen of the United States, residing at Bridgeport, county of Fairfield, State of Connecticut, have invented certain new and useful Improvements in Vehicle-Springs, of which the following is a specification.

This invention relates to springs for vehicles, with more particular reference to self-propelled vehicles, and has for its object the provision of comparatively simple yet exceedingly effective and dependable cushioning means, adapted to be interposed between the running-gear and the body or the body-supporting springs of a vehicle.

My improved cushioning means, while doubtless alone capable of satisfactorily performing all of the functions which ordinary metallic vehicle springs are called upon to perform, is primarily intended by me to supplement or be used in connection with the usual metal springs, and when so used effect all of the results attained through the employment of pneumatic tires. In fact, when a device embodying my invention is employed, pneumatic tires are superfluous, whereby I effect a material saving in the initial cost of the vehicle as well as the expense of maintenance thereof.

My invention will be more readily understood by reference to the accompanying drawings, forming a part of this specification, in which—

Figure 1:
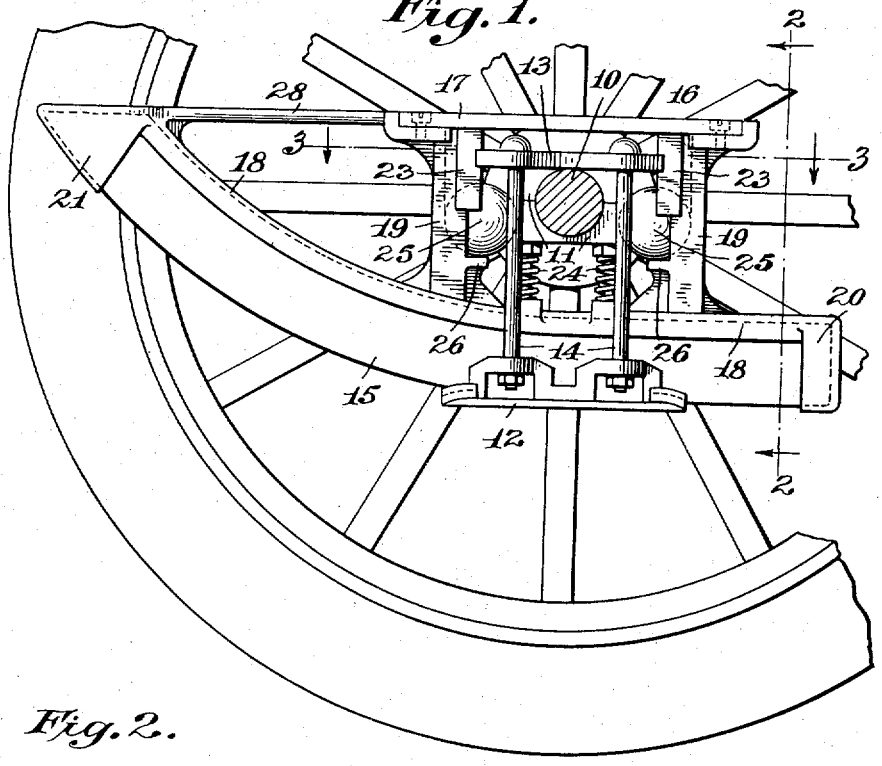
Figure 2:
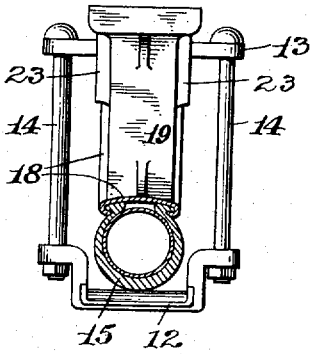
Figure 3:
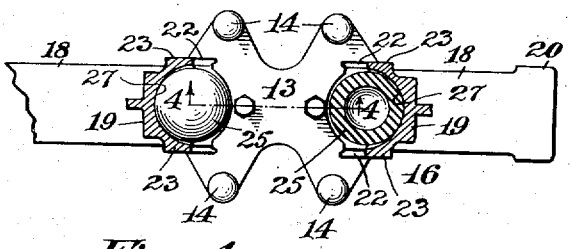
Figure 4:
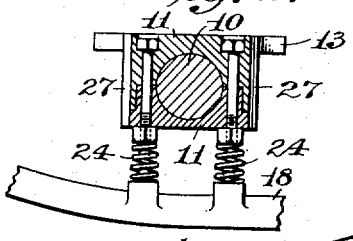

Figure 1 is a side elevation of a device embodying my invention as applied to a vehicle wheel; Fig. 2 is a transverse vertical section taken substantially on the line 2—2 of Fig. 1; Fig. 3 is a fragmentary horizontal section taken substantially on the line 3—3 of Fig. 1, with one of the shock-absorbing balls shown in section, and Fig. 4 is a fragmentary section taken substantially on the line 4—4 of Fig. 3, the balls being omitted.

Referring now to the drawings in detail, numeral 11 designates an axle-box within which is journaled the axle 10 of one of the four wheels of a vehicle. This axle-box 11 includes, either integral therewith or rigidly secured thereto, a top plate 13, from which are suspended the bolt-rods 14 which carry at their lower ends the support or stirrup 12. Upon this support is placed the yieldingly elastic cushion 15, and I prefer that this cushion should be pneumatic—in fact, a section of an ordinary pneumatic tire would suffice for my purpose, the open ends thereof, and the ends of the inner tube, if employed, being suitably closed, but it will be apparent that in view of the fact that this cushion is not designed to withstand the forces of traction, the more extensive reinforcement of this cushion, along what would normally be its tread portion, is not necessary. Mounted upon this cushion is a frame which, for the purposes of this description, is shown as comprising an upper plate 17, upon which rests the body of the vehicle or the body-supporting metal springs (not shown), a curved lower plate 18, which rests upon the cushion, and vertical posts or uprights 19 19 rigidly connecting said upper and lower plates. To give stability to the frame structure, I have also shown a brace 28 interposed between the end of the plate 18 and one of the uprights 19 to which the top plate 17 is secured.

It will be apparent that a particular shape of cushion and a particular configuration of frame and arrangement of frame-parts are not essential to this invention, and may be modified to meet the requirements of manufacture and use and the taste of purchasers, but I prefer to employ a frame shaped not unlike the runner of a sled, the lower plate 18 of which conforms to the substantially circular-cylindrical configuration of a tire-shaped cushion, for reasons to which I shall hereinafter refer. Employing such general configuration of cushion, as shown, I provide at one end of the lower plate 18 a socket 20, and at the other end of said plate a socket 21, these sockets receiving, containing and supporting the ends of the cushion 15. It will be apparent that the cushion 15 alone has the effect of a spring which to a certain extent dissipates forces generated by sudden movement of the running gear relative to the supported vehicle body, but in order to further dissipate the forces due to a sudden vertical movement of the wheel, and particularly to absorb the forces of re-action when the cushion 15 has been elastically distorted in a vertical direction by the weight of the vehicle body and its contents, I interpose between the axle body 11 and the plate 18 elastically yielding bodies, preferably coil springs 24 24, under compression, as shown. Similarly, I interpose between said axle box and each of the uprights 19, a resilient body, in this case preferring to employ spherical balls 25 25 of inherently elastic material, such as soft rubber and preferably provided with a substantially central air cushion. In this manner, I provide additional cushioning against the objectionable laterally-directed forces operating to overcome inertia, and similarly dissipate the forces of re-action resulting from the energy stored in cushioning means. In short, it will be seen that I materially reduce the size of the usual pneumatic cushion, remove the same from contact with the road-bed, support the same from the axle-box, mount a vehicle-body-supporting frame thereon, and interpose both laterally and vertically acting shock-absorbers between said frame and said axle-box.

All things considered, I believe that a coil-spring is the best form of shock-absorber for the purposes of my invention, largely on account of the fact that resilient balls, or cushions of pliable and elastic material, are more subject to wear and more quickly lose their inherently resilient quality, and are therefore shorter lived. However, coil-springs cannot well be employed between the axle box and the uprights on account of the fact that these parts have relative movement in a vertical direction as well as laterally toward and away from each other. Furthermore, the vertical shocks to be absorbed are undoubtedly of much greater magnitude than those due to the sudden application of laterally directed forces, and on these accounts I prefer to employ the coil springs 24 24 between the axle box 11 and the lower plate 18, and the resilient balls 25 25 between said axle box and the uprights 19 19. Of course, it is necessary to provide means for retaining said balls in position, with a certain freedom of vertical movement to minimize friction and abrasion, and I therefore form grooves 27 27 in the faces of said uprights 23 23 contiguous to said balls, and ledges or shoulders 26 26 which form steps which limit downward movement of said balls. The width of the curved groove is somewhat in excess of the diameter of the balls in order to provide room for the lateral expansion of the latter under compression between the axle box and the uprights.

In use, it will be apparent that such forces as are generated when a wheel drops into a rut or strikes an obstruction in the road, will be transmitted from the axle through the cushion to the body-carrying frame. These forces, being generated both by gravity and by the momentum of the moving body, will tend to impart both vertical and lateral movement to the body of the vehicle relative to the axle. The object of all vehicle springs, of course, is not only to minimize the extent of such movement, but to yieldingly impede the same and thus dissipate the suddenly applied forces which tend to cause such movement.

It will be noted that the curvature of my cushion 15, when used independently or in connection with ordinary metal springs, enables me to interpose the same between my body-supporting frame and the cushion-support 12 in such manner that it receives the impulses due to both gravity and momentum, and to overcome the objectionable effects of the rebound, in either direction, I interpose the shock absorbers, as shown, between the axle box and the frame. By thus providing for yieldingly-resisted lateral as well as vertical movements of the frame relative to the axle, and by providing means for taking up the return movement or rebound in both directions, I insure a quality of easy riding that has not heretofore been attained through the use of any vehicle springs known to the trade.

Many modifications of minor details of my improved vehicle spring will doubtless readily suggest themselves to those skilled in the art to which it appertains, and I therefore do not desire to limit my invention to the specific construction herein shown and described.

I claim as new and desire to secure by Letters Patent:

1. In a device of the character described, the combination, with an axle-box and the axle of a vehicle wheel journaled therein, of a cushion supported from said axle-box, and a vehicle-body-supporting frame mounted on said cushion and having both vertical and lateral movements relative to said axle-box, said frame having connection with said axle-box through the medium of shock-absorbers interposed between said axle-box and both horizontal and vertical parts of said frame.

2. In a device of the character described, the combination, with an axle-box and the axle of a vehicle wheel journaled therein, of a cushion supported from said axle-box, a vehicle-body-supporting frame mounted on said cushion and having both vertical and lateral movements relative to said axle-box, said cushion being so shaped and positioned as to yieldingly resist both vertical and lateral movements of said frame, and means interposed between said axle-box and said frame to yieldingly resist the reactive forces of said cushion in both of said directions of movement.

3. In a device of the character described, the combination, with an axle-box and the axle of a vehicle wheel journaled therein, of a cushion supported from said axle-box, and a vehicle-body-supporting frame mounted on said cushion and having both vertical and lateral movements relative to said axle-box, said frame having connection with said axle-box through the interposition of a relatively stationary shock-absorber between said axle-box and a horizontal portion of said frame and a relatively movable shock-absorber between said axle-box and a vertical portion of said frame.

4. In a device of the character described, the combination, with an axle-box and the axle of a vehicle wheel journaled therein, of a cushion supported from said axle-box, a vehicle-body-supporting frame mounted on said cushion and having both vertical and lateral movements relative to said axle-box, said cushion being so shaped and positioned as to yieldingly resist both vertical and lateral movements of said frame, and relatively stationary means interposed between said axle-box and a horizontal portion of said frame and relatively movable means between said axle-box and a vertical portion of said frame to yieldingly resist the reactive forces of said cushion in both of said directions of movement.

5. In a device of the character described, the combination, with an axle-box and the axle of a vehicle wheel journaled therein, of a cushion supported from said axle-box, and a vehicle-body-supporting frame mounted on said cushion and having both vertical and lateral movements relative to said axle-box, said frame having connection with said axle-box through the interposition of a spring between said axle-box and a horizontal portion of said frame and a resilient ball between said axle-box and a vertical portion of said frame, and means for retaining said ball in place.

6. In a device of the character described, the combination, with an axle-box and the axle of a vehicle wheel journaled therein, of a cushion supported from said axle-box, a vehicle-body-supporting frame mounted on said cushion and having both vertical and lateral movements relative to said axle-box, said cushion being so shaped and positioned as to yieldingly resist both vertical and lateral movements of said frame, springs interposed between said axle-box and a horizontal portion of said frame and resilient balls interposed between said axle-box and vertical portions of said frame to resist the reactive forces of said cushion in both of said directions of movement, and means for holding said balls in place.

7. In a device of the character described, the combination, with an axle-box and the axle of a vehicle wheel journaled therein, of a cushion supported from said axle-box, and a vehicle-body-supporting frame mounted on said cushion and having both vertical and lateral movements relative to said axle-box, said frame being provided with means for engaging and sustaining the ends of said cushion and having connection with said axle-box through the medium of shock-absorbers interposed between said axle-box and both horizontal and vertical parts of said frame.

8. In a device of the character described, the combination, with an axle-box and the axle of a vehicle wheel journaled therein, of a cushion supported from said axle-box, a vehicle-body-supporting frame mounted on said cushion and having both vertical and lateral movements relative to said axle-box, said frame being provided with means for engaging and sustaining the ends of said cushion and said cushion being so shaped and positioned as to yieldingly resist both vertical and lateral movements of said frame, and means interposed between said axle-box and said frame to yieldingly resist the reactive forces of said cushion in both of said directions of movement.

9. In a device of the character described, the combination, with an axle-box and the axle of a vehicle wheel journaled therein, of a support carried by said axle-box, a cushion resting on said support, a frame resting on said cushion and comprising both horizontal and vertical portions, sockets at the ends of said frame which receive and sustain the ends of the cushion, and resilient means between said axle-box and both horizontal and vertical portions of said frame to yieldingly resist the re-active forces of said cushion in both of said directions.

10. A vehicle spring comprising an axle-box, a support suspended therefrom, a cushion resting on the support, a frame resting on the cushion and comprising upper and lower plates, uprights, a brace connecting the upper and lower plates and sockets at the end of the lower plate and at the intersection of the brace and lower plate which receive the ends of the cushion, and resilient means between the axle box and the uprights and lower plate for taking up the rebound of the frame.

11. A vehicle spring comprising an axle-box, a support suspended therefrom, a cushion resting on the support, a frame resting on the cushion and comprising uprights having ledges and vertical grooves, resilient balls in the grooves which engage the axle box and rest on the ledges and springs between the axle box and the frame.

12. A vehicle spring comprising an axle box having a top plate with recesses in its ends, a support suspended therefrom, a cushion resting on the support, a frame resting on the cushion and having bearings engaging the recesses, for the purpose set forth, and resilient means between the axle-box and the frame for taking up the lateral and vertical rebound of the frame.

In testimony of the foregoing, I have hereunto set my hand in the presence of two subscribing witnesses.

LYMAN D. JONES.

Witnesses:

F. GLENDON HALL,

R. F. WHITNEY.

Copies of this patent may be obtained for five cents each, by addressing the "Commissioner of Patents, Washington, D. C."